United States Patent [19]
Kinast

[11] 3,825,891
[45] July 23, 1974

[54] BRAKE-LINING WEAR-INDICATOR
[75] Inventor: Norbert Kinast, Stuttgart, Germany
[73] Assignee: Daimler-Benz Aktiengesellschaft, Stuttgart-Unterturkheim, Germany
[22] Filed: Jan. 12, 1972
[21] Appl. No.: 217,172

[30] Foreign Application Priority Data
Jan. 16, 1971    Germany............................ 2102077

[52] U.S. Cl. ............................ 340/52 A, 200/61.4
[51] Int. Cl. ........................................... G08b 21/00
[58] Field of Search............... 340/52 A, 52 B, 52 F; 200/61.4, 61.44, 61.89

[56] References Cited
UNITED STATES PATENTS
3,456,236   7/1969   Labartino et al. ................ 340/52 A
3,550,079   12/1970  Clifford............................ 340/52 B
3,660,815   5/1972   Rees ................................ 340/52 A
3,675,197   7/1972   Bennett et al. ................... 340/52 A Primary Examiner—Alvin H. Waring
Attorney, Agent, or Firm—Craig & Antonelli

[57] ABSTRACT

A brake lining wear indicator installation for a brake with a rotatable brake member constructed, for example, as drum or disk, against which the brake lining retained in a brake shoe or the like is forced during the braking operation; an electric line carried in the brake is thereby ruptured or connected with ground as soon as the wear of the brake lining exceeds a predetermined value and a lamp is caused to be lighted up or another indicator representing an electrical resistance is thereby rendered operable.

28 Claims, 2 Drawing Figures

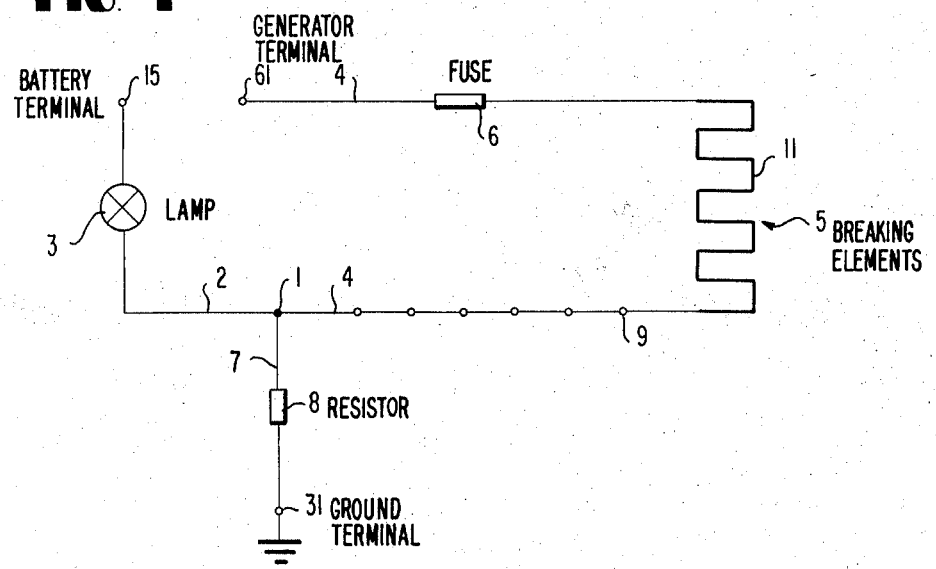
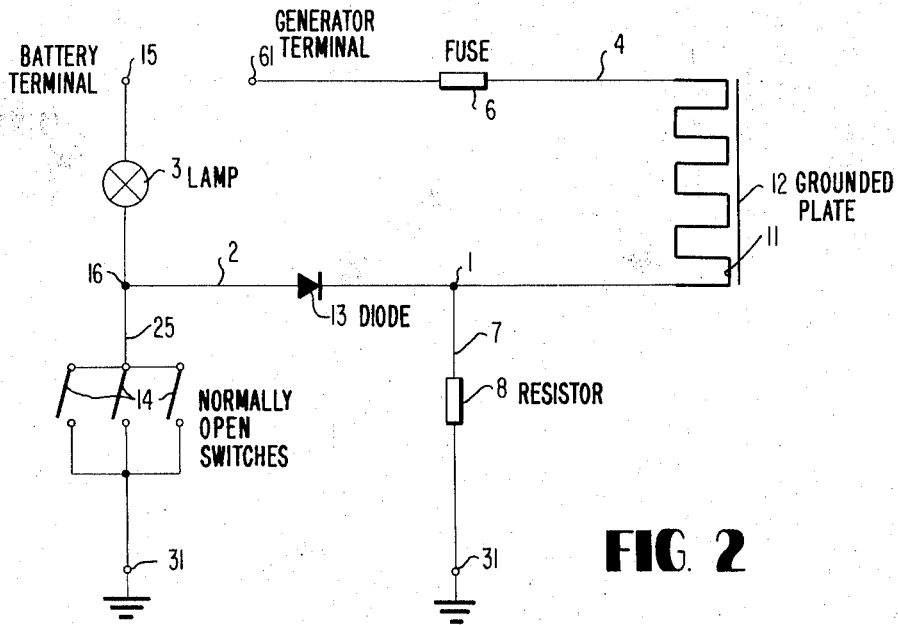

BRAKE-LINING WEAR-INDICATOR

The present invention relates to a brake lining wear indicator installation for a brake with a rotatable brake element constructed as drum or disk, against which the brake lining held fast in a brake shoe is pressed during the braking.

Installations for the indication of the wear of the brake linings are already known which operate by means of an electric feeler or sensor and which with a wear of the brake lining close a circuit by means of which an electric indicator is operated. In particular, also circuits for the indication of the wear of the brake linings are known which operate by means of a relay or a transistor, two resistances, and a diode. These circuits are very costly, and they also entail the disadvantage that in case of a connection with ground due to a damaged cable, this failure is not indicated by such prior art system. If the brake linings are worn subsequently thereto, this is also no longer indicated by the prior art installations once the ground connection is established as a result of a defective cable.

It is the aim of the present invention to provide an inexpensive indicating system for the wear of the brake linings which does not entail the aforementioned disadvantages.

The underlying problems are solved according to the present invention in that an electric line carried in the brake is interrupted or connected with ground as soon as the wear of the brake lining exceeds a predetermined value and as a result thereof an incandescent lamp is caused to light up or another indicator representing an electrical resistance is set into operation.

According to one embodiment of the present invention, in each brake lining there may be arranged a breaking element with an electric line extending within the same which is broken or interrupted due to rupture or breakage of the breaking element below a predetermined brake lining thickness. A branch point which is electrically connected with ground by way of a resistor (30 ohm/10W) may be electrically connected, on the one hand, by way of an incandescent lamp (1.2W/12V) with the battery of the motor vehicle, and on the other hand, by way of breaking elements as well as of a fuse having a slight current rating (1 amp) with the vehicle generator. The term generator in this application refers to any known type of generator, such as a D.C. generator A.C. alternator.

Furthermore, according to a further embodiment of the present invention in a brake lining wear indicating system equipped with an electrically conductive brake member, an electric line may be so carried in each brake lining that when the brake lining falls below a predetermined brake lining thickness it comes into contact with the ground. A branch point, which is electrically connected with the ground by way of a resistor (30 ohms/10W) may be additionally electrically connected, on the one hand, by way of a diode as well as an incandescent lamp (12V/1.2W) with the battery, and on the other, by way of electrical lines carried in the brake linings, which come into electrical contact with the brake member only upon wear of the brake lining, as well as by way of a fuse having a small current rating (1 amp) with the generator of the motor vehicle. If the current from the generator is conducted at any place to ground by way of the fuse, especially upon wear of the brake linings, then the fuse burns through and the incandescent lamp, fed by the battery, lights up.

In both cases, in addition to the indication of the wear of the brake linings, also further failures may be indicated, for example, an inadequate brake oil level, an engagement of the choke or of the hand brake or the like. The respective switches initiating the indication may be constructed thereby exclusively as normally closed switches opening upon the occurrence of the event to be indicated and may be connected in series with the fuse. On the other hand, the switches for the fault indication may also be constructed as normally open switches closing upon the occurrence of the event to be indicated thereby, and these switches may all be connected in parallel to one another between ground and a further connecting point which is disposed between the incandescent lamp and the first connecting point.

Accordingly, it is an object of the present invention to provide a brake lining wear indicating installation which avoids by simple means the aforementioned shortcomings and drawbacks encountered in the prior art.

Another object of the present invention resides in a brake lining wear indicator which is inexpensive, utilizes relatively few inexpensive parts and is reliable in operation.

A further object of the present invention resides in a brake lining wear indicating installation for motor vehicles which indicates any failures in the indicating system.

Still another object of the present invention resides in a brake lining wear indicator system which consumes relatively small amounts of power normally supplied during the drive by the generator and not the battery.

These and further objects, features and advantages of the present invention will become more apparent from the following description when taken in connection with the accompanying drawing which shows, for purposes of illustration only, two embodiments in accordance with the present invention, and wherein:

FIG. 1 is a schematic circuit diagram of an indicating installation for the wear of brake linings in accordance with the present invention, in which breaking or interrupting elements initiate the indication, and FIG. 2 is a schematic circuit diagram of a modified embodiment of an installation for the indication of the wear of the brake linings in accordance with the present invention in which a ground connection by means of electrical lines embedded in the brake linings initiates the indication.

Referring now to the drawing wherein like reference numerals are used to designate like parts in the two views thereof, and more particularly to FIG. 1, in the circuit diagram illustrated in this figure an incandescent lamp 3 is connected in a line 2 connecting a branch point 1 with the positive terminal 15 of the battery (not shown). The lamp 3 has thereby a rating, for example, of 1.2W for 12V. A further line 4 leads from the branch point 1 by way of breaking or interrupting elements generally designated by reference numeral 5 and of any conventional construction and by way of a fuse 6 with a 1 amp. rating for a small current flow to the terminal 61 of the generator (not shown). Since the breaking or interrupting elements 5 are of conventional construction, forming no part of the present invention, a detailed description thereof is dispensed with herein.

A further line 7 leads from the branch point 1 by way of a resistor 8 of 30 ohms and 10W to the ground terminal 31.

The breakable elements 5 accommodate therewithin an electric line 11. They are so constructed that they break when a predetermined degree of wear of the brake linings has been exceeded, and that the electric line disposed within the same is interrupted as a result thereof, i.e., the circuit including line 4 is opened. Thereafter, current can flow from the positive terminal 15 of the battery through the line 2 by way of the lamp 3, the branch point 1 and the line 7 including resistor 8 to the ground terminal 31 whereby the incandescent lamp 3 is lighted up. If one thereby desires to further connect several other indicating installations, for example, a warning device for an excessively low brake oil level or an indicator that the choke or the hand brake is pulled up, then one only needs to insert into the line 4 a few other opening devices 9, such as conventional normally closed switches which open upon the occurrence of a predetermined event, which are respectvely opened in the presence of the emergency condition to be indicated or in case of the faulty circuit condition to be indicated thereby. Of course, warning devices can also be actuated by normally open members of any conventional construction, such as conventional switches which close upon the occurrence of a predetermined event, which are then connected like the normally open switches 14 in FIG. 2.

In the circuit diagram illustrated in FIG. 2, reference numeral 15 again designates the positive terminal of the battery (not shown) and reference numeral 61 the terminal for the generator (not shown), while the incandescent lamp 3 is again connected in the circuit 2 and a resistor 8 with a resistance of 30 ohms and 10W rating is connected in the branch line 7 leading from the branch point 1 to ground 31. Only instead of the breaking or rupturing elements 5 of FIG. 1, lines 11 are embedded in the brake linings in the embodiment of FIG. 2 which come into electrical contact with the ground by way of a grounded plate 12, i.e., in the practical case either with the brake drum or the brake disk upon wear of the brake linings. Only a diode 13 is additionally interconnected in the line 2 between the lamp 3 and the branch point 1. If in this case the line ends 11 come into electric connection with the ground plate 12, then the fuse 6 which can withstand only a load of 1 amp burns through. Current can then flow from the positive terminal 15 of the battery by way of the lamp 3, the diode 13, the branch point 1 and the resistance 8 to the ground terminal 31 whereby the incandescent lamp 3 is lighted up.

Other switches may also be interconnected in this indicating system which indicate the emergency condition in various apparatus, for example, with an excessively low brake oil level or pulled up choke or hand brake.

In these cases so-called normally open members 14 of any conventional construction, for example, in the form of normally open switches which close upon the occurrence of a predetermined event, are connected in parallel with one another in a line 25 which connects the ground terminal 31 with the point 16 disposed between the lamp 3 and the diode 13. Also, in this case normally closed devices which open upon the occurrence of a predetermined event, may be used for the same purpose which will then be connected as shown in FIG. 1 where the same are designated by reference numeral 9.

The essentials of the present invention reside in the fact that two mutually independent voltage potentials, namely that of the battery and that of the generator are utilized for the indication of the brake lining wear. These potentials are separated from one another in the embodiment of FIG. 2 by a diode 13. The circuit provided with the diode offers the advantage that in case of damage of the cable 4 which may come in contact with ground as a result thereof, also this fault will be indicated and the indicating lamp with worn brake linings does not become extinguished after actuation thereof and flickers as a result thereof since with the first ground connection the fuse 6 burns through and the lamp 3 thereby lights up permanently. Furthermore, a further advantage of the described invention resides in that for both circuits only very few individual parts such as a resistor, a fuse, an incandescent lamp and in one case additionally a diode are required. Another advantage resides in that the small power which has to be supplied during the normal drive, even when the incandescent lamp 3 does not light up, is never drained from the battery but is always taken off from the generator.

During the operation of the vehicle, the following takes place:

If the ignition is turned on, then the lamp 3 lights up. After actuation of the starter, the lamp 3 becomes extinguished. If the brake linings are worn, then the lamp 3 is lighted up, on the one hand by reason of the fact that the lines in the brake elements have been interrupted (FIG. 1) or, on the other, by reason of the fact that the lines 11 in the brake elements have come into electrical contact with ground (FIG. 2). In both cases, i.e., with the use of a circuit according to FIG. 1 or FIG. 2, the lamp 3 can also light up when the insulation of the cable 4 is damaged and the cable is thereby connected to ground because the fuse 6 will burn through in both cases.

In order that in the case of the circuit illustrated in FIG. 1 no reverse currents can flow by way of the lamp 3 to the battery also when the voltage of the generator is larger than that of the battery, a diode may also be interconnected in this embodiment between the branch point 1 and the lamp 3.

While I have shown and described only two embodiments in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A brake lining wear indicating installation for a brake with a rotatable brake member and a brake lining retained in a brake means, said member being pressed against said lining, comprising an electrical circuit including a branch point connected in series with resistor means to ground, indicating means and a motor vehicle battery connected in series to said branch point, and means for effecting a change in current flow operatively disposed with the brake lining, connected in series with a fuse having a low current capacity between a motor vehicle generator and the branch point whereby a predetermined degree of wear of the brake lining will change the current flow in said means for effecting such that the indicating means becomes operable.

2. A brake lining wear indicating installation according to claim 1, characterized in that said indicating means is an electric lamp which lights up upon wear of the brake lining.

3. A brake lining wear indicator installation according to claim 1, characterized in that said indicating means is an indicator representing, in effect, an electrical resistance which is rendered operable upon predetermined wear of the brake lining.

4. A brake lining wear indicator installation according to claim 1, characterized in that the indicating means is operated by a break in the electric line means carried in the brake.

5. A brake lining wear installation according to claim 1, characterized in that said indicating means becomes operable when said electric line means is connected with ground as a result of predetermined wear of the respective brake lining.

6. A brake lining wear indicator installation according to claim 1, characterized in that a braking element with an electric line means extending within each brake lining is interrupted by breakage of a breaking element when the brake lining thickness drops below a predetermined value.

7. A brake lining wear indicator installation with an electrically conductive brake member according to claim 1, characterized in that an electric line means is so carried in each brake lining that it comes into contact with ground when the thickness of the brake lining drops below a predetermined brake lining thickness.

8. A brake lining wear indicator installation according to claim 1, wherein said resistor means has a value of about 30 ohms and a rating of 10W.

9. A brake lining wear indicator installation according to claim 1, characterized in that the resistor means has a resistance of about 30 ohms and a rating of 10W while the fuse has a rating of about 1 amp.

10. A brake lining wear indicator installation according to claim 2, characterized in that a diode is connected between the lamp and the branch point.

11. A brake lining wear indicator installation according to claim 10, characterized in that the resistor means has a resistance of about 30 ohms and a rating of 10W while the fuse has a rating of about 1 amp.

12. A brake lining wear indicator installation according to claim 6, characterized in that in addition to he breaking elements arranged in the brake, series connected normally closed means are provided between the branch point and the fuse which open upon occurrence of predetermined events for the indication of further failures by means of the same lamp.

13. A brake lining wear indicator installation according to claim 12, wherein said normally closed means are normally closed switches opening upon occurrence of the predetermined event.

14. A brake lining wear indicator installation according to claim 10, characterized in that normally open means are connected in parallel with one another between the diode and the lamp, on the one hand, and ground, on the other, for the indication of further failures by means of the same lamp.

15. A brake lining wear indicator installation according to claim 14, wherein said normally open means are normally open switches closing upon the occurrence of the predetermined event.

16. A brake lining wear indicating device for use in brake systems having rotatable brake members with brake lining means, said member being pressed against said means, said indicating device comprising first circuit means for applying a first voltage source across an indicating means, second circuit means for applying a second voltage source across current changing means within said brake lining means, means for opposing said first voltage and second voltage sources, and means for activating said current changing means such that said indicating means becomes operable.

17. A brake lining wear indicating device according to claim 16, wherein said first circuit means includes in series a battery and an indicating means, said battery being a motor vehicle battery.

18. A brake lining wear indicating device according to claim 16, wherein said second circuit means includes in series a motor vehicle generator, a fuse having a relatively small current rating, and said current changing means.

19. A brake lining wear indicating device according to claim 16, wherein said means for opposing includes resistor means in series with ground connected to a branch point between said first circuit means and said second circuit means.

20. A brake lining wear indicating device according to claim 17, wherein said second circuit means includes in series a motor vehicle generator, a fuse having a relatively small current rating, and said current changing means.

21. A brake lining wear indicating device according to claim 20 wherein said means for opposing includes resistor means in series with ground connected to a branch point between said first circuit means and said second circuit means.

22. A brake lining wear indicating device according to claim 16, wherein said means for activating includes breaking element means disposed within said brake lining means, said breaking elements being broken upon a predetermined amount of said brake lining means.

23. A brake lining wear indicating device according to claim 21, wherein said means for activating includes breaking element means disposed with said brake lining means, said breaking elements being broken upon a predetermined amount of said brake lining means.

24. A brake lining wear indicating device according to claim 16, wherein said means for activating includes electric line means disposed within said brake lining means, said electric line means being electrically connected to rotatable brake members upon a predetermined amount of wear of said brake lining means.

25. A brake lining wear indicating device according to claim 21, wherein said means for activating includes electric line means disposed within said brake lining means, said electric line means being electrically connected to rotatable brake members upon a predetermined amount of wear of said brake lining means.

26. A brake lining wear indicating device according to claim 17, wherein said first circuit means further includes in series a diode.

27. A brake lining wear indicating device according to claim 24, wherein said first circuit means further includes in series a diode.

28. A brake lining wear indicating device according to claim 16, wherein said indicating means is an incandescent lamp.

* * * * *